(12) United States Patent
Thierry et al.

(10) Patent No.: US 6,696,544 B1
(45) Date of Patent: Feb. 24, 2004

(54) METHOD FOR MAKING POLYAMIDES

(75) Inventors: Jean-Francois Thierry, Francheville (FR); Matthieu Helft, Lyons (FR)

(73) Assignees: Rhodianyl, Boulogne-Billancourt Cedex (FR); Dominique Kayser, Ste Columbe (FR)

( * ) Notice: Subject to any disclaimer, the term of this patent is extended or adjusted under 35 U.S.C. 154(b) by 0 days.

(21) Appl. No.: 10/009,523

(22) PCT Filed: Jun. 8, 2000

(86) PCT No.: PCT/FR00/01588

§ 371 (c)(1),
(2), (4) Date: Aug. 8, 2002

(87) PCT Pub. No.: WO00/77075

PCT Pub. Date: Dec. 21, 2000

(30) Foreign Application Priority Data

Jun. 11, 1999 (FR) .............................................. 99 07647

(51) Int. Cl.⁷ ........................ C08G 69/26; C08G 69/28; C08F 2/00
(52) U.S. Cl. ........................ 528/310; 528/332; 528/335; 528/339; 528/340; 528/347; 526/59
(58) Field of Search ................................ 528/310, 332, 528/335, 340, 347, 339; 526/59

(56) References Cited

U.S. PATENT DOCUMENTS

| 3,852,226 A | * | 12/1974 | Sprauer .................... 528/339.3 |
| 4,131,712 A | * | 12/1978 | Sprauer ....................... 528/335 |
| 4,438,257 A | * | 3/1984 | Miyamoto et al. ........... 528/347 |
| 5,155,184 A | * | 10/1992 | Laurent et al. ................ 526/59 |
| 5,339,255 A | * | 8/1994 | Suzuki et al. ................ 700/269 |
| 5,532,487 A | * | 7/1996 | Brearley et al. ........ 250/339.12 |
| 5,674,974 A | * | 10/1997 | Brearley et al. ............. 528/340 |
| 6,169,162 B1 | * | 1/2001 | Bush et al. .................. 528/310 |
| 2001/0053338 A1 | * | 12/2001 | Bush et al. .................. 422/110 |

FOREIGN PATENT DOCUMENTS

| EP | 0 001 157 | 3/1979 |
| EP | 0 364 376 | 4/1990 |
| WO | WO 96/16107 | 5/1996 |
| WO | WO 96/16108 | 5/1996 |

* cited by examiner

*Primary Examiner*—P. Hampton-Hightower
(74) *Attorney, Agent, or Firm*—Burns, Doane, Swecker & Mathis, L.L.P.

(57) ABSTRACT

The invention concerns a method for making polyamide. More particularly, the invention concerns a method for making polyamides derived from the reaction between a diacid and a diamine. It concerns a method for making a polyamide derived from the reaction of at least a diacid with at least a polyamide comprising the following steps: preparing a first mixture of diacid and diamine with a diacid/diamine molar ratio ranging between 0.8 and 0.995, preferably ranging between 0.95 and 0.99 in a first reactor (5); preparing a second mixture of diacid and diamine with a diacid/diamine molar ratio ranging between 1.005 and 1.2, preferably between 1.01 and 1.05, in a second reactor (4); introducing in melted form a first flow of the first mixture and a second flow of the second mixture in a stirred polymer reactor (7); drawing, preferably, continuously, from said reactor a flow of polyamide prepolymer; feeding said polyamide flow into a finishing step to obtain the desired degree of polymerisation. The invention is characterised in that the stoichiometry of the polyamide in the reactor (7) or the acid function/amine function ratios in the different reactors are measured by near infrared spectrometric analysis, and by controlling the feed flows in the different reactors using the results of said analyses.

15 Claims, 1 Drawing Sheet

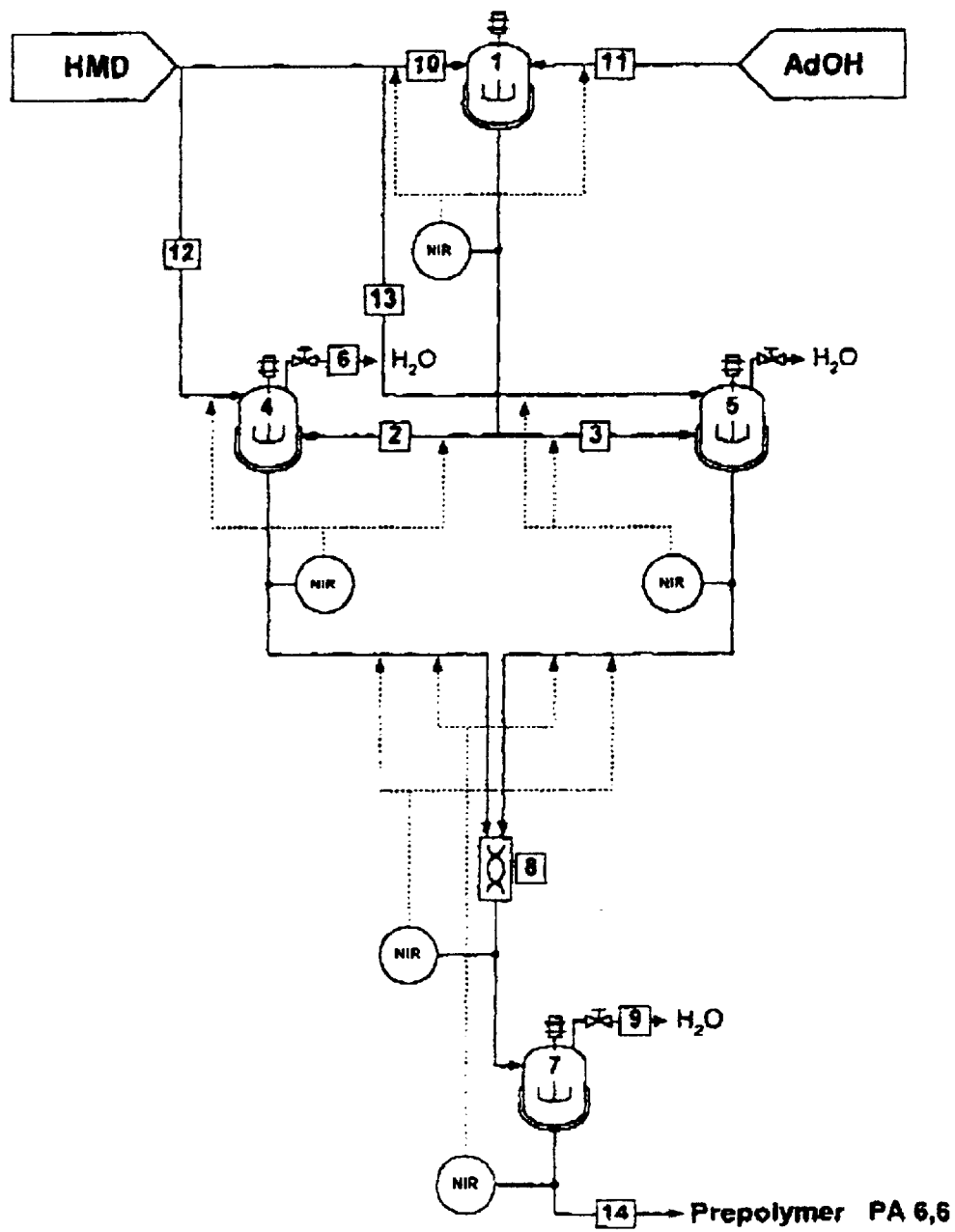

METHOD FOR MAKING POLYAMIDES

The present invention relates to a process for the manufacture of polyamide.

It relates more particularly to the manufacture of polyamides resulting from the reaction between a diacid and a diamine.

Polyamides are polymers of great industrial and commercial importance. Thermoplastic polyamides are obtained either by reaction between two different monomers or by polycondensation of a single monomer. The invention applies to polyamides resulting from two different monomers, the most important polyamide of which is poly (hexamethylene adipamide). Of course, these polyamides can be obtained from a mixture of diacids and diamines. Thus, in the case of poly(hexamethylene adipamide), the main monomers are hexamethylenediamine and adipic acid. However, these monomers can comprise up to 25 mol % of other diamine or diacid monomers or even of amino acid or lactam monomers.

This class of polyamides resulting from two different monomers is generally manufactured by using, as starting material, an amino acid salt obtained by mixing a diacid with a diamine in a stoichiometric amount and in a solvent such as water.

Thus, in the manufacture of poly(hexamethylene adipamide), adipic acid is mixed with hexamethylenediamine in water to produce a hexamethylenediamine adipate better known under the name of Nylon salt or "N Salt".

The solution of N salt is optionally concentrated by evaporating the water.

The polyamide is obtained by heating such a solution of Nylon salt at high temperature and high pressure to evaporate the water, while avoiding any formation of solid phase in order to prevent the mixture from setting solid.

This operation consumes a great deal of energy and also does not make it possible to completely control the stoichiometry as amine can be evaporated or entrained by the water. Such an entrainment or evaporation requires supervision of the process in order to reestablish the stoichiometry and can be troublesome as the diamine entrained can contaminate the effluents discharged by the production plant.

In addition, the need to heat to a high temperature under a high pressure can lead to the formation of decomposition compounds which contaminate the manufactured polyamide, in particular with regard to its color.

To avoid the use of water, processes without water have been provided without real success. This is because it is very difficult to control the stoichiometry between the two reactants when at least one of them is in a solid form.

In addition, it is impossible to feed the reactants in a liquid form as, at the temperature required, decomposition of the monomers takes place.

However, certain processes for the preparation of a polyamide without water and without solvent have already been provided. Thus, U.S. Pat. No. 4,131,712 discloses a process which consists in mixing, in the liquid state, a diacid-rich diamine/diacid mixture with a second diamine-rich diamine/diacid mixture, so as to obtain a composition which is as close as possible to stoichiometry. The mixture is maintained at a temperature sufficient to prevent any solidification and to carry out the polycondensation. However, in this process, it is difficult to control and to obtain a stoichiometric mixture as the diamine partially evaporates during the introduction of the diamine-rich mixture.

To avoid this disadvantage, a process for the manufacture of polyamide without water or solvent is disclosed in patent application WO 96/16107.

This process consists in feeding, into a first stage of a multi-stage reactor or plate column, a diacid or a diacid-rich diacid/diamine mixture and then feeding, at an intermediate stage, diamine or a diamine-rich diacid/diamine mixture while controlling the amount of diamine added in order to obtain a stoichiometric mixture, the stoichiometry being measured continuously by an analysis means, for example analysis by Near InfraRed (NIR).

This process requires the use of a special reactor for its implementation, the operation of which may prove to be difficult to control. Furthermore, the control of the stoichiometry is provided by the addition of diamine or of a diamine-rich diacid/diamine mixture, which can result in large variations in the diacid/diamine ratio and in variations in the total flow rate into the reactor.

One of the aims of the present invention is to provide a process for the manufacture of high molecular weight polyamide without water or solvent which makes it possible to control the stoichiometry, it being possible for this process to be carried out in reactors of simple design. In addition, the process is easy to direct.

To this end, the invention provides a process for the manufacture of a polyamide resulting from the reaction of at least one diacid with at least one diamine comprising the following stages:

preparing a first mixture of diacid and of diamine with a diacid/diamine molar ratio of between 0.8 and 0.995, preferably of between 0.95 and 0.99, preparing a second mixture of diacid and diamine with a diacid/diamine ratio of between 1.005 and 1.2, preferably between 1.01 and 1.05, introducing, in the molten form, a first stream of the first mixture and a second stream of the second mixture into a stirred polymerization reactor, withdrawing, preferably continuously, a stream of polyamide prepolymer from said reactor, feeding said polyamide stream into a finishing stage in order to obtain the desired degree of polymerization.

The first and second mixtures are preferably anhydrous. The term "anhydrous mixture" should be understood as meaning mixtures which can comprise up to 10% by weight of water. The term "anhydrous" is used in the present description in contrast with the conventional process, which uses an aqueous solution of Nylon salt.

The process of the invention also comprises a means for the continuous analysis of the mixture of the streams of the first and second mixtures, preferably the two streams, in order to determine the balance between acid and amine functional groups. The term "acid and amine functional groups" is understood to mean the total acid and amine functional groups present, which have or have not reacted. This process consists in controlling, from the result of the preceding analysis, at least one of the first and second streams of mixtures, preferably both streams, in order to obtain a ratio of the acid functional groups to the amine functional groups equal to the value desired according to the type of polyamide manufactured (by way of indication, the acceptable margin of variation for this ratio with respect to the desired value is plus or minus 0.0005).

According to a preferred embodiment of the invention, the analytical means is a Near InfraRed (NIR) spectrometric analysis device.

The process of the invention thus makes it possible to obtain a balanced polyamide by controlling the stoichiometry of the mixture. Furthermore, as the adjustment or the control of this stoichiometry is carried out by the control of the streams of the first and second mixtures, the size of the variation in the acid/amine ratio will be low after the mixing of the two streams, making it possible to obtain more homogeneous production.

In addition, as indicated above, the polymerization reactor is a simple reactor comprising only conventional stirring and heating means.

The reactors in which the first and second mixtures are prepared, and the polymerization reactor, are can, for example, be reactors with mechanical stirring or reactors with external recirculation. In the latter case, the feeding with mixtures and/or the withdrawing of the product and/or heating can advantageously be carried out in the recirculation loop. The reactors can be heated using a jacket device and optionally an internal coil. In addition, the reactors can be open to gases.

According to a preferred characteristic of the invention, the first and second mixtures of diacid and diamine are prepared by mixing, in the solid state, a diacid with the diamine in the presence of a small amount of water and then heating at moderate temperature in order to obtain an amine salt.

In another embodiment, the mixtures are heated at a higher temperature with the removal of water in order to obtain prepolymers with an acid ending for the first mixture and an amine ending for the second mixture.

The process for the preparation of these mixtures may be analogous to that disclosed in U.S. Pat. No. 4,131,712 for the preparation of acid-rich mixtures.

In another preferred characteristic of the invention, the finishing stage comprises a rapid evaporation of the condensation water present in the polyamide exiting from the polymerization reactor, which evaporation is obtained, for example, by reducing the pressure of the polyamide stream. The polyamide is subsequently maintained for a predetermined time at a polymerization temperature at atmospheric pressure or under reduced pressure in order to obtain the desired degree of polymerization.

These final finishing stages are those used in industrial processes for the manufacture of polyamide from an aqueous solution of amine salt.

According to a novel characteristic of the invention, the polymerization carried out in the polymerization reactor is carried out under an autogenous or regulated pressure in order to avoid any loss of diamine or at least to reduce them to a minimum.

The process of the invention can be used for the manufacture of poly(hexamethylene adipamide) from adipic acid, as diacid monomer, and from hexamethylenediamine, as diamine monomer.

The process of the invention also makes it possible to manufacture other polyamides from a diacid monomer chosen from the group consisting of glutaric, suberic, sebacic, dodecanedioic, isophthalic, terephthalic, azelaic, pimelic and naphthalenedicarboxylic acids, for example.

Mention may also be made, as diamine monomers, in addition to hexamethylenediamine, of heptamethylenediamine, tetramethylenediamine, octamethylenediamine, nonamethylenediamine, decamethylenediamine, 2-methylpentamethylenediamine, undecamethylenediamine, dodecamethylenediamine, xylylenediamine or isophoronediamine.

The invention preferably applies to the manufacture of polyamide from diacid and diamine monomers which are respectively at least 80 mol % adipic acid and hexamethylenediamine.

It is also possible to prepare polyamides from diacid and diamine monomers comprising a low proportion (less than 20 mol %) of amino acid or lactam. Mention may thus be made of the manufacture of copolyamide PA 6,6/6 from adipic acid/hexamethylenediamine monomers comprising a predetermined amount of caprolactam. This different monomer can be present in the first or second mixtures or in only one of these mixtures.

In the embodiment of the process for the manufacture of poly(hexamethylene adipamide), the first and second mixtures are advantageously prepared from an adipic acid (AdOH)/hexamethylenediamine (HMD) mixture with a composition close to that of the eutectic, that is to say 19% by weight of HMD and 81% by weight of AdOH.

This eutectic mixture has a melting point in the region of 100° C.

The eutectic mixture is introduced into two reactors into which hexamethylenediamine is introduced in order to obtain respectively a first mixture rich in diacid (diacid/diamine ratio of between 1.005 and 1.2) and a second mixture rich in diamine (diacid/diamine ratio of between 0.8 and 0.995).

According to another embodiment of the invention, the first and/or second mixtures are themselves obtained by mixing two premixers of diacid and of diamine, the proportions of which are within ranges from 0.5% to 20% respectively above and below the value targeted for each mixture. For each mixture, the streams of the two premixes are automatically controlled according to the value of the ratio desired for said mixture. According to this embodiment, the accuracy of the stoichiometric ratios of the mixtures and their control are improved. According to this embodiment, the device for the implementation of the invention comprises a cascade of several stages of reactors in which the accuracy of the stoichiometry is increasingly important. The number of stages of reactors can be between 1 and 10. The premixes can themselves be prepared analogously to the preparation of the mixtures, for example from an AdOH/HMD mixture for the composition close to that of the eutectic.

Advantageously, the diacid/diamine ratios are controlled by chemical or potentiometric analyses. In a particularly preferred embodiment, these diacid/diamine ratios are determined by a Near InfraRed spectrometric analysis.

The temperature for the preparation of the mixtures is advantageously greater than 200° C. in order to obtain an amidation reaction and thus a prepolymer with an acid or amine ending, according to the mixture.

According to one embodiment of the invention, the first and second mixtures thus obtained are withdrawn from the reactors as separate streams A and B, and these two streams are combined and introduced into a stirred polymerization reactor.

It is possible to provide static mixers in the feed pipe of the polymerization reactor and/or a premixing reactor.

The flow rate of each stream A and B is specified in order to obtain a ratio of the amine functional groups to the acid functional groups which is as close as possible to the desired value.

According to the invention, the flow rate of the streams is controlled and adjusted by automatic control according to the result of the analysis of the ratio of the acid functional groups to the amine functional groups present either in the reaction mass formed by the mixing of the two streams, for example in the premixing reactor or after the static mixers, or in the reaction mass present in the polymerization reactor or at the outlet of said polymerization reactor.

The regulation of the flow rates for entry into the various reactors can be carried out via pumps or pressure-reducing valves.

To obtain efficient regulation of the stoichiometric ratio, this analysis of the acid and amine functional groups is carried out continuously by Near InfraRed spectrometric analysis. The automatic control can also be related to the measurement of stoichiometric ratio in the two streams M1 and M2.

This analytical technique is disclosed in particular in U.S. Pat. No. 5,155,184 for the determination of a property of a polymer, such as a polyolefin. It consists briefly in measuring the absorbance of a light beam by a sample in a wavelength range between 800 and 2 600 nm and in producing a calibration curve, identification being carried out by chemometry of the differences in absorbance at different wavelengths and the variations in a property P measured by a chemical or physicochemical analytical method.

This technique for determining a property of a polymer has also been disclosed in U.S. Pat. No. 5,532,487 and WO 96/16107. Thus, in U.S. Pat. No. 5,532,487, the Near InfraRed spectrometric analysis method is used for the determination of the concentrations of the acid and amine end functional groups in a polyamide in the solid state, for example on a yarn, or on anhydrous diacid/diamine mixtures.

Likewise, patent WO 96/16107 discloses the use of a Near InfraRed spectrometric analysis method for determining the concentration of acid and/or amine end functional groups in a polyamide in a molten medium at the reactor outlet. However, in both these examples, the polyamide analyzed is substantially anhydrous.

In the process of the invention, this determination of the concentration of acid and/or amine end functional groups is carried out by analysis of the reaction mass comprising the water resulting from the amidation reaction, for example in a bypass loop of the main stream, in an optional bypass of the main stream, or in a recirculating loop of a reactor.

The process of the invention thus makes possible the manufacture of a polyamide from diamine and diacid without use of water or solvent in reactors of simple design and which are easy to control.

Furthermore, as the control of the stoichiometry is obtained by varying the feeding of mixture comprising either a slight excess of acid or a slight excess of amine, the variations in the acid/amine ratio will be small. Thus, the operation of the plant is more regular, without large-scale variation.

A BRIEF DESCRIPTION OF THE DRAWING

Other advantages and details of the invention will become more clearly apparent in the light of the example, given below solely by way of indication, and with the detailed description, made with reference to the single FIGURE, which represents a block diagram of a part of the process of the invention.

EXAMPLE 1

According to the diagram represented in the single FIGURE, a concentrated aqueous solution of hexamethylenediamine, with a concentration by mass of water equal to 10%, and adipic acid powder are fed continuously, respectively via pipes 10, 11, into a first stirred reactor 1, in order to obtain a mixture with a ratio by weight of diacid monomer of 81% and of diamine monomer of 19%. This mixture M1 can comprise a small amount of water, for example of the order of 7% by weight with respect to the diacid monomer/diamine monomer mixture. The mixture is maintained at a temperature of approximately 126° C.

The mixture M1 is fed into two stirred reactors 4 and 5 by withdrawing from the reactor 1 via the pipes 2 and 3 respectively.

However, in an embodiment not illustrated, the mixture M1 from the reactor 1 can be fed into a storage tank and then fed from the latter into the reactors 4 and 5 to allow the process to be carried out more flexibly.

In the example illustrated, the reactor 4 is maintained at 228° C. under a pressure of 15 bar absolute and the stream of mixture M1 fed via the pipe 2 is 41 kg/h. A hexamethylenediamine (HMD) solution comprising 10% of water is fed into this reactor 4 via the pipe 12 according to a controlled flow rate in order to obtain, in the reactor 4, a mixture M2 comprising a ratio of the acid functional groups with respect to the amine functional groups equal to 1.03.

According to the invention, this acid/amine ratio is measured continuously in the reactor 4 or, as illustrated, at the outlet of this reactor by a Near InfraRed analysis method described below. The result of this analysis is processed by an automatic control system which governs the flow rates of the streams of mixture M1 and of HMD solution fed into the reactor 4.

In the single FIGURE, the dotted lines represent, on the one hand, the automatic controlling of the streams according to the NIR measurements and, secondly, the analyses of the compositions of the streams by NIR.

The residence time of the mixture in the reactor 4 is approximately 48 minutes. The reactor 4 comprises an outlet 6 which makes it possible to discharge the water present and/or formed in the reactor. The flow rate for discharge of this water in the form of vapor is 7.6 kg/h. The mixture M2 withdrawn from the reactor 4 is a preamidated adipic acid/HMD mixture rich in acid functional group.

According to the invention, a second preamidated adipic acid/HMD mixture M3 is produced in the reactor 5, in a manner analogous to the manufacture of the mixture M2 in the reactor 4. However, the flow rate of the streams of mixture M1 and of hexamethylenediamine solution fed via the pipe 13 are specified and controlled in order to obtain, in the reactor 5, a mixture exhibiting a ratio of acid functional groups with respect to the amine functional groups equal to 0.98.

In the example illustrated, the temperature and pressure conditions are identical to those in the reactor 4. However, without departing from the scope of the invention, these conditions can be slightly different.

As for the manufacture of the mixture M2, the flow rates of the streams of mixture M1 and of HMD are automatically controlled according to the result of the continuous measurement, by a Near InfraRed analysis method described below, of the acid functional group/amine functional group ratio in the mixture M3.

The two mixtures M2 and M3 resulting respectively from reactors 4 and 5 are introduced into a polycondensation-reactor 7 maintained at a temperature of 248° C. under a pressure of 17.5 bar absolute.

In the embodiment illustrated, the two streams of mixture M2 and M3 are fed into a premixer 8 which can be composed, for example, of an array of static mixers positioned in a pipe or of any other mixing means, such as a stirred vessel.

The flow rates of the streams of mixtures M2 and M3 are controlled in order to obtain, in the reactor 7, a mixture exhibiting a specific acid functional group/amine functional group ratio according to the characteristics of the polyamide to be manufactured.

Thus, in the example illustrated, these flow rates are specified in order to obtain a mixture in the reactor 7 exhibiting a difference between the concentrations of acid functional groups and amine functional groups (CEG-AEG) at the outlet of the reactor 7 in the region of 50 meq/kg.

According to the invention, this difference in concentrations or the acid functional group/amine functional group ratio is measured continuously by a spectrometric analysis method in the Near InfraRed, the flow rates of the streams of mixture M2 and M3 fed into the premixer 8 being automatically controlled according to this measurement in order to maintain the difference value between two preset values.

The residence time of the mixture or prepolymer in the reactor 7 is in the region of 30 minutes. The reactor 7 is equipped with a pressure-reducing valve 9 in order to allow the discharge of a portion of the water formed by the amidation reaction. The stream of water vapor discharged via the pressure-reducing valve 9 is equal to 4.5 kg/h. The control of this discharged flow rate of water vapor makes it possible to control the degree of progression of the amidation reaction and thus the degree of polymerization of the prepolymer withdrawn from the reactor 7, and the pressure in the latter.

The mean flow rate for withdrawing the prepolymer from the reactor 7 via the pipe 14 is 102 kg/h. The prepolymer thus recovered has a number-average molar mass in the region of 3800 and comprises approximately 5% of water.

The process illustrated makes it possible to continuously produce a prepolymer at the outlet of the reactor 7 exhibiting a concentration of amine end groups (AEG) equal on average to 238.2 meq/kg and a concentration of acid end groups (CEG) equal on average to 289.5 meq/kg, that is to say a difference between the concentrations of acid functional group and amine functional group of 51.3 meq/kg, for a desired set value of 50 meq/kg.

The prepolymer thus produced is converted to polyamide with the desired molar mass compatible with conventional uses by addition to a stream for the manufacture of a polyamide originating from a process for the manufacture of polyamide 6,6 from hexamethylenediamine adipate salt.

Conventional and continuous processes for the manufacture of PA 6,6, described, for example, in the work "Polymerisation processes", edited by Schildknecht (Wiley, interscience, 1977), pp. 424 to 467 (chapter 12, "Preparation of 6,6-Nylon and related polyamides" by Donald B. Jacobs and Joseph Zimmerman), comprise, in the state of finishing the polymer, a flasher, a vapor/prepolymer separator and a finisher. The stream of prepolymer obtained by the process of the invention is added to the conventional stream of polyamide upstream of the flasher.

The addition of this stream of polyamide exiting from the process in accordance with the invention does not disturb the quality and the properties of the polyamide obtained at the outlet of the finishing stages. These properties are identical to those of the polyamide manufactured without this additional stream.

The process of the invention thus makes possible the manufacture of a compatible polyamide to be used as starting material in conventional uses, such as the manufacture of yarns, fibers or films or the manufacture of molded articles.

The method for measurement by spectrometric analysis in the Near InfraRed (NIR) spectral region consists in carrying out a continuous measurement by transmission on the reaction mixture: the lightwave is emitted by the lamp of the spectrometer and is conveyed by a single-strand optical fiber to the emitting probe directly in contact with the reaction mixture. The light information is partially absorbed by the product through which it passes and is then captured by the receiving probe carefully aligned with the emitting probe, conveyed by a second single-strand optical fiber and then collected by the detector of the spectrometer. The software acquisition of the spectra reconstitutes the entire transmission spectrum in order to convert it into an absorbance spectrum. The acquisition of the spectra thus takes place over a range of wavenumbers from 4600 to 9000 $cm^{-1}$ with a resolution of 16 $cm^{-1}$: each spectrum results from the average of 32 scans carried out at an average rate of 128 scans per minute.

The spectral information collected by continuous analysis is transcribed into concentration of acid end groups and amine end groups per kg of dry product (respectively CEG and AEG) and into CEG-AEG difference using models produced by calibration with samples analyzed by potentiometric analysis methods, for example described in "Encyclopedia of Industrial Chemical Analysis", 1973, volume 17, page 293.

The entire NIR measurement device is designed to withstand an internal pressure of 150 bar at a temperature of 300° C. It is composed of a cell made of 316L stainless steel and of two probe holders made of Z30C13 steel. The cell body is heated electrically, the heating being regulated by a measurement of temperature in the metal body or in the polymer.

The pipe for circulating the analyzed product is cylindrical, with a diameter of 1 cm. This stream is intercepted perpendicularly by the probe holders screwed onto the threaded lugs of the cell body.

The probes used are of the FCP-040 Cross Line Probe type and are supplied by Axiom Analytical Incorporated. These probes are screwed into the probe holders so as to produce a conical metal-metal seal, the sapphire needle of approximately 8 mm being flush with the end of the probe holder. The space between the emitting probe and the receiving probe is thus produced by a symmetrical adjustment by screwing the two probe holders facing one another: it is set at 4 mm and remains constant during the calibration and prediction phases in continuous use. The probes are connected to the spectrometer via an optical fiber measuring approximately 15 meters. The spectrometer itself is connected to a computer in an operating room which gives a real-time report of the result of the on-line analysis.

Thus, the measurement carried out on the mixtures M2 and M3 at the outlet of the reactors 4 and 5 has a standard error of prediction of 10.1 meq/kg for the AEG, 13.0 meq/kg for the CEG and 12.7 meq/kg for the difference CEG-AEG, with coefficients of correlation of greater than 0.99.

The degree of accuracy achieved by this statistical analysis of the NIR spectra makes possible an adjustment of the ratio of the acid end groups to the amine end groups in the mixtures M2 and M3 by. automatic control of the flow rates of the fluids fed respectively into the reactors 4 and 5.

The measurement carried out at the outlet of the reactor 7 has a standard error of prediction of 4.6 meq/kg for the AEG, 5.1 meq/kg for the CEG and 4.7 meq/kg for the difference CEG-AEG, with coefficients of correlation of 0.990 for the AEG, 0.991 for the CEG and 0.995 for the difference CEG-AEG.

The degree of accuracy achieved by this statistical analysis of the NIR spectra also makes possible an adjustment of the ratio of acid end groups to amine end groups by automatic control of the streams of the mixtures M2 and M3 fed into the premixer or the reactor 7.

Likewise, this method of analysis by spectrometry in the Near InfraRed also makes it possible to specify the composition of the mixture M1 and to automatically control the flow rates of the monomers fed into the reactor 1.

The site of the probes in the process may be different according to the arrangement of the reactors or the presence of storage units or reactors.

The number of analysis points on the process can vary from one to several. Thus, it is possible to have only one monitoring of the composition of the prepolymer at the outlet of the reactor 7 and to automatically control according to this measurement the flow rates of the mixtures M2 and M3 and/or the feed flow rates of the HMD solution and mixture M1 into the reactors 4 and 5, without, however, departing from the scope of the invention. However, for better control of the process, it is preferable to monitor the composition of each of the mixtures M1 to M4 and to automatically control the feed flow rates of reactants into each reactor for manufacturing these mixtures.

An example of a system for monitoring and automatically controlling the feed flow rates of the streams of mixtures into the various reactors is illustrated by the dotted lines in the single FIGURE.

As indicated above, the process of the invention applies preferably to the manufacture of PA 6,6 but it can also be used for the manufacture of other polyamides obtained from diacid and diamine monomers and in particular for the manufacture of copolyamides, such as copolyamides PA 6,6/6.

What is claimed is:

1. A process for the manufacture of a polyamide from at least one diacid and from at least one diamine, comprising the following stages:

preparing a first mixture M2 of diacid and of diamine with a diacid/diamine molar ratio of between 1.005 and 1.2, preparing a second mixture M3 of diacid and diamine with a diacid/diamine ratio of between 0.8 and 0.995, introducing, in the molten form, a stream of the first mixture M2 and a stream of the second mixture M3 into a stirred polymerization reactor, withdrawing a stream of prepolymer from said reactor and feeding said stream to a finishing stage in order to obtain the degree of desired polymerization;

and in that the mixture of the streams of the first and second mixture is continuously analyzed in order to determine the ratio of the acid functional groups to the amine functional groups, and at least the flow rate of one of said streams of first or second mixture is automatically controlled according to the result of the analysis in order to maintain a ratio of the acid functional groups to the amine functional groups between two predetermined set values.

2. The process as claimed in claim 1, wherein the streams of the first and second mixtures are mixed before introducing into the polymerization reactor.

3. The process as claimed in claim 1, wherein the polymerization reactor operates under an autogenous pressure or a regulated pressure.

4. The process as claimed in claim 2, wherein the continuous analysis is carried out on the mixture of streams before introducing into the polymerization reactor.

5. The process as claimed in claim 1, wherein the continuous analysis is carried out on the mixture present in the polymerization reactor.

6. The process as claimed in claim 1, wherein the continuous analysis is carried out on the prepolymer withdrawn from the polymerization reactor.

7. The process as claimed in claim 1, wherein the first and second mixtures M2 and M3 are obtained by mixing a solution of diamine monomer with a mixture M1 rich in diacid monomer.

8. The process as claimed in claim 7, wherein the flow rate of the entering streams of the solution of diamine monomers and of the mixture M1 rich in diacid monomer is automatically controlled according to the result of the continuous analysis of the acid and amine functional groups in the mixtures M2 and M3.

9. The process as claimed in claim 1, wherein the continuous analyses of the mixtures or prepolymer are carried out by a method of spectrometric analysis in the Near InfraRed.

10. The process as claimed in claim 1, wherein the diacid monomers are selected from the group consisting of adipic, glutaric, suberic, sebacic, dodecanedioic, isophthalic, terephthalic, azelaic and pimelic acids.

11. The process as claimed in claim 1, wherein the diamine monomers are selected from the group consisting of hexamethylenediamine, heptamethylenediamine, octamethylenediamine, nonamethylenediamine, decamethylenediamine, 2-methylpentamethylenediamine, undecamethylenediamine, dodecamethylenediamine and xylylenediamine.

12. The process as claimed in claim 1, wherein the diacid monomer comprises at least 80 mol % of adipic acid.

13. The process as claimed in claim 1, wherein the diamine monomer comprises at least 80 mol % of hexamethylenediamine.

14. The process as claimed in claim 12, wherein the first and second mixtures are prepared by addition of hexamethylenediamine to an adipic acid/hexamethylenediamine eutectic mixture.

15. The process as claimed in claim 1, wherein the finishing stage comprises a stage of reduction in pressure of the stream of polyamide in order to evaporate the water and a stage of maintaining the polymer at the polymerization temperature under reduced pressure or at atmospheric pressure.

* * * * *